(12) United States Patent
Horita

(10) Patent No.: US 7,869,089 B2
(45) Date of Patent: Jan. 11, 2011

(54) METHOD AND SYSTEM FOR PREDICTING PRINT COLORS

(75) Inventor: Shuhei Horita, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 276 days.

(21) Appl. No.: 12/153,113

(22) Filed: May 14, 2008

(65) Prior Publication Data

US 2008/0282915 A1 Nov. 20, 2008

(30) Foreign Application Priority Data

May 15, 2007 (JP) .............................. 2007-129593
Apr. 21, 2008 (JP) .............................. 2008-110333

(51) Int. Cl.
*H04N 1/60* (2006.01)
*H04N 1/46* (2006.01)
*G03F 3/08* (2006.01)
*G06K 9/00* (2006.01)

(52) U.S. Cl. ..................... 358/1.9; 358/504; 358/518; 358/519; 358/521; 358/523; 358/527; 358/536; 358/538; 358/540; 358/3.23; 382/162; 382/164; 382/167

(58) Field of Classification Search .................. 358/1.9, 358/519, 521, 527, 518, 3.23, 536, 523, 504, 358/538, 540; 382/162, 164, 167
See application file for complete search history.

(56) References Cited

U.S. PATENT DOCUMENTS 6,026,216 A * 2/2000 Ohtsuka et al. .............. 358/1.9
6,441,923 B1 * 8/2002 Balasubramanian et al. ..... 358/3.23
7,692,831 B2 * 4/2010 Nishikawa ................. 358/518

FOREIGN PATENT DOCUMENTS

JP 2006-128760 A 5/2006

* cited by examiner

Primary Examiner—Charlotte M Baker
(74) Attorney, Agent, or Firm—Sughrue Mion, PLLC

(57) ABSTRACT

A profile generator determines differences between the standard spectral reflectances of a color chart printed under standard density conditions and the spectral reflectances of a color chart printed while the density of one of the colors C, M, Y, K is changed, and the densities of the other colors are secured to standard densities. When density variations are established, the profile generator generates a print predicting profile using spectral reflectances produced by adding the standard spectral reflectances and the difference with respect to the color whose density has changed. The colors of a print produced when the density of a desired color is changed are predicted with high accuracy using the print predicting profile.

20 Claims, 15 Drawing Sheets

METHOD AND SYSTEM FOR PREDICTING PRINT COLORS

BACKGROUND OF THE INVENTION

1. Field of the Invention

The present invention relates to a method and system for predicting the print colors of a print produced by a printing press.

2. Description of the Related Art

Prints are produced by generating original film plates in various colors including cyan (C), magenta (M), yellow (Y), and black (K), for example, producing PS plates (presensitized plates) from the original film plates by exposure and development, mounting the PS plates on a printing press such as a rotary press or the like, and adjusting printing conditions, including printing pressure, dampening water, temperature, etc.

Therefore, complex steps are involved in producing prints. In order to produce a print in desired colors, it has been customary, prior to the production of the print, to generate a proof sheet using a simple output device such as a color printer or the like, to confirm the generated proof sheet, and to adjust the printing conditions.

Japanese Laid-Open Patent Publication No. 2006-128760, for example, discloses a method of generating color charts respectively with a printing press and a color printer, or the like, colorimetrically measuring the color charts, determining an ICC (International Color Consortium) profile representing an associative relationship between the halftone dot percentage (%) of inks in the colors C, M, Y, K and the calorimetric values, and generating a proof sheet for prints using the ICC profile. The density of a solid image, i.e., an image with a 100% halftone dot percentage, is usually defined as a standard density by a user, which may be a printing company or the like. The printing conditions, representing the film thickness of inks on printing presses, are adjusted to achieve the standard density.

The standard density of prints may differ from user to user. If the standard density is to be changed, then it is necessary to reprint the color charts and to produce an ICC profile once again. However, such a process is time-consuming because the color charts, each of which is made up of a number of color patches, need to be printed and calorimetrically measured for the new standard density.

SUMMARY OF THE INVENTION

It is a general object of the present invention to provide a method and system for predicting the print colors of a print highly accurately, easily and quickly, in response to changes in the standard density for the print.

A major object of the present invention is to provide a method and system for easily generating a proof sheet for a print that has a density desired by a user.

Another object of the present invention is to provide a method and system for easily and quickly generating a print predicting profile for a changed standard density, and then predicting the colors of a print highly accurately using the generated print predicting profile.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
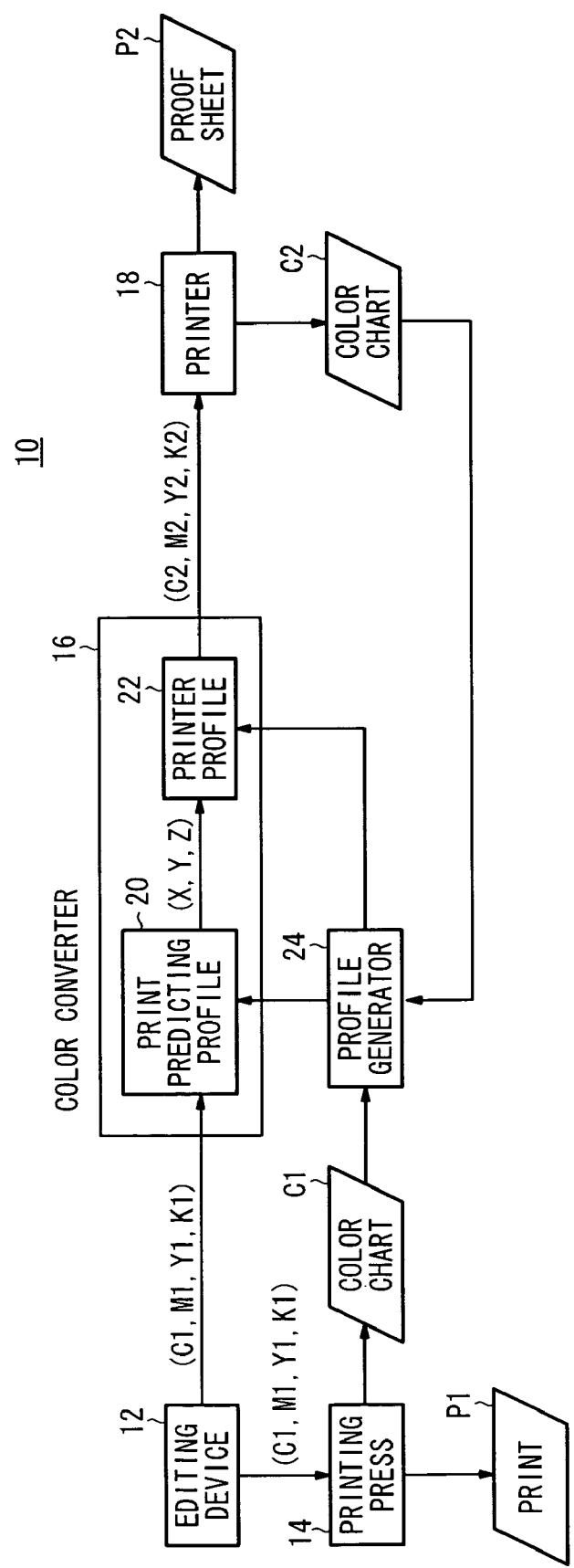
FIG. 1 is a block diagram of an overall arrangement of a print color predicting system according to an embodiment of the present invention.

In the following descriptions, like or corresponding parts are denoted by like or corresponding reference characters throughout the views.

FIG. 1 shows in block form a print color predicting system 10 according to an embodiment of the present invention. As shown in FIG. 1, the print color predicting system 10 comprises an editing device 12 for editing image data C1, M1, Y1, K1 for controlling colors C, M, Y, K, a printing press 14 for producing a print P1 based on the edited image data C1, M1, Y1, K1, a color converter 16 for converting the edited image data C1, M1, Y1, K1 into converted image data C2, M2, Y2, K2 for predicting colors, a printer 18 for generating a proof sheet P2 for the print P1 based on the converted image data C2, M2, Y2, K2, and a profile generator 24 for generating a print predicting profile 20 and a printer profile 22, which are incorporated in the color converter 16.

The print predicting profile 20 is a profile for predicting device-independent colorimetric values of the print P1 produced by the printing press 14, e.g., colorimetric values X, Y, Z or colorimetric values L*, a*, b* of the print P. The print predicting profile 20 is generated by the profile generator 24 based on existing image data C, Y, M, K and measured values of a color chart C1, which is produced from the image data C, M, Y, K by the printing press 14.

The printer profile 22 is a profile for converting device-independent colorimetric values of the print P1 predicted by the print predicting profile 20, e.g., colorimetric values X, Y, Z or colorimetric values L*, a*, b* of the print P, into image data C, M, Y, K depending on output characteristics of the printer 18. The printer profile 22 is generated by the profile generator 24 based on existing image data C, M, Y, K and measured values of a color chart C2, which is produced from the image data C, M, Y, K by the printer 18.

Figure 2:
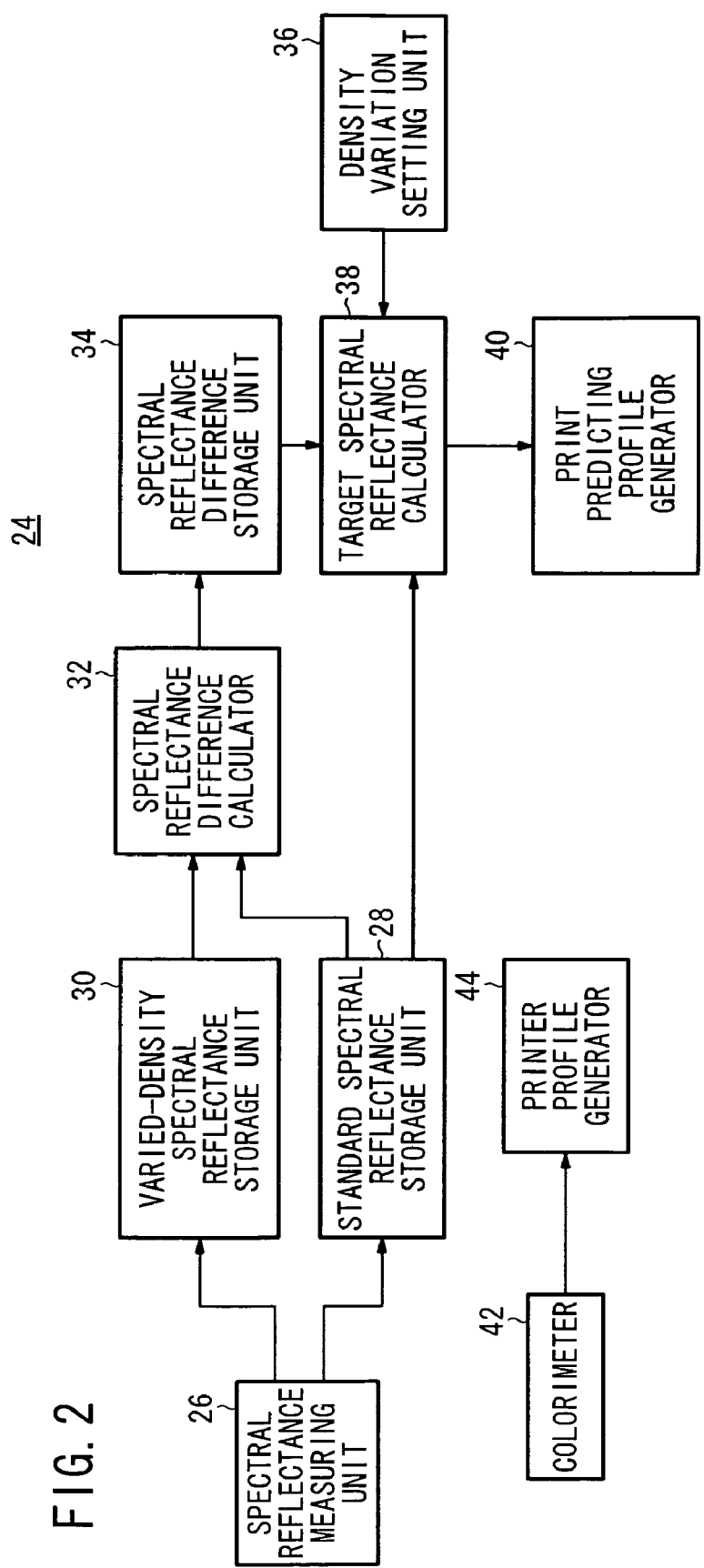
FIG. 2 is a block diagram of a profile generator of the print color predicting system shown in FIG. 1.

FIG. 2 shows an arrangement of the profile generator 24 in block form. As shown in FIG. 2, the profile generator 24 includes a spectral reflectance measuring unit 26 for measuring spectral reflectances of a color chart C1, a standard spectral reflectance storage unit 28 for storing standard spectral reflectances (standard measured values), which are obtained by setting the printing press 14 to conditions for producing a standard density (standard density conditions) and measuring a generated color chart C1 (standard color chart) with the spectral reflectance measuring unit 26, and a varied-density spectral reflectance storage unit 30 for storing varied-density spectral reflectances (variation measured values), which are obtained by measuring color charts C1 generated at varied standard densities (variation color charts) with the spectral reflectance measuring unit 26.

The standard density conditions refer to conditions for adjusting printing conditions, such as printing pressure, etc., of the printing press 14, such that when the printing press 14 produces the print P1 with 100% halftone dot percentages set for the inks C, M, Y, K, the densities of the print P1 (solid image) will become the standard densities defined by the user, which may be a printing company or the like.

The profile generator 24 also includes a spectral reflectance difference calculator 32 for calculating differences between the standard spectral reflectances and the density-variation spectral reflectances, a spectral reflectance difference storage unit 34 for storing the calculated spectral reflectance differences, a density variation setting unit 36 for setting density variations for changing the standard densities for the respective colors C, M, Y, K to target densities desired by the user, a target spectral reflectance calculator 38 for calculating target spectral reflectances for achieving target densities using the standard spectral reflectances, the spectral reflectance differences and the density variations, and a print predicting profile generator 40 for generating a print predicting profile 20 using the target spectral reflectances.

The profile generator 24 further includes a colorimeter 42 for measuring colorimetric values, e.g., calorimetric values X, Y, Z or colorimetric values L*, a*, b*, of the color chart C2 generated by the printer 18, and a printer profile generator 44 for generating a printer profile 22 using the measured calorimetric values.

Figure 3:
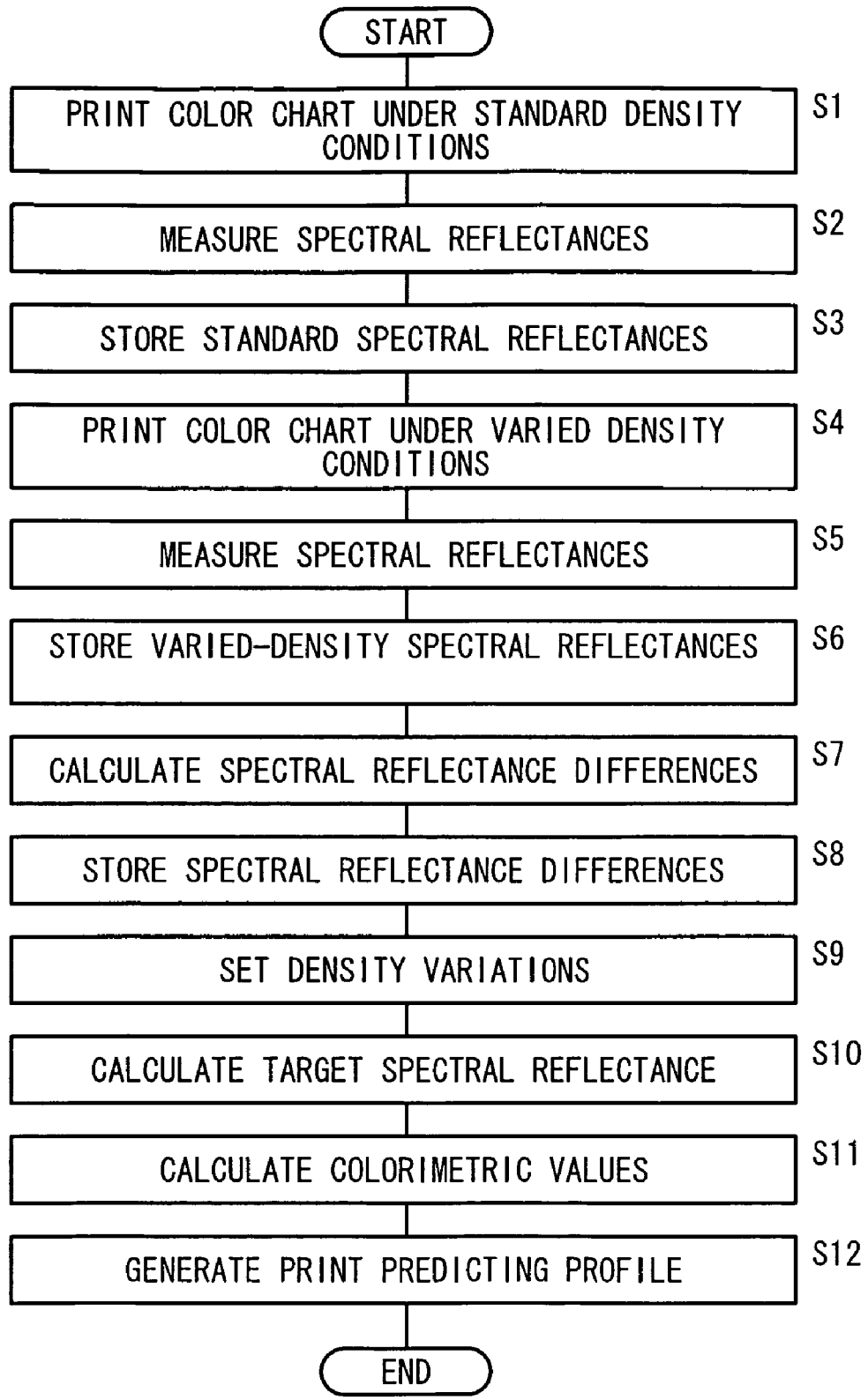
FIG. 3 is a flowchart of a sequence for generating a print predicting profile.

The print color predicting system 10 according to the present embodiment is basically constructed as described above. A print color predicting method carried out by the print color predicting system 10 will be described below with reference to the flowchart shown in FIG. 3.

The editing device 12 supplies known image data C1, M1, Y1, K1 to the printing press 14, which is set to the standard density conditions and prints a color chart C1 (step S1). The color chart C1 comprises a plurality of color patches printed in respective halftone dot percentages (%) of the image data C1, M1, Y1, K1 at predetermined intervals in the range from 0% to 100%. The standard density conditions for the printing press 14 are established such that the density (solid density) of color patches produced by the inks C, M, Y, K at 100% halftone dot percentages is equal to the standard density defined by the user.

The color patches on the color chart C1 generated by the printing press 14, which have been set to the standard density conditions, are measured for spectral reflectance by the spectral reflectance measuring unit 26 (step S2). The measured spectral reflectances are stored as standard spectral reflectances in the standard spectral reflectance storage unit 28 (step S3).

Then, the standard density conditions of the printing press 14 are changed to given varied density conditions, and the printing press 14 prints color charts C1 under the varied density conditions using the same image data C1, M1, Y1, K1 as that used for printing the color chart C1 under the standard density conditions (step S4). The varied density conditions of the printing press 14 are established by varying the densities (solid densities) of the color patches of the respective inks C, M, Y, K at 100% halftone dot percentages independently for the respective inks, and securing the densities of inks other than the varied inks to the standard density conditions, so that the densities under the varied density conditions are, for example, −0.2, −0.1, +0.1, and +0.2 smaller or greater than the standard densities under the standard density conditions in terms of optical densities. Accordingly, sixteen color charts C1 are generated under the varied density conditions, with the densities of the colors C, M, Y, K at 100% halftone dot percentages being set to the standard density −0.2, the standard density −0.1, the standard density +0.1, and the standard density +0.2, respectively.

The color patches on the color charts C1 generated by the printing press 14 under the varied density conditions are measured for spectral reflectance by the spectral reflectance measuring unit 26 (step S5). The measured spectral reflectances are stored as varied-density spectral reflectances in the varied-density spectral reflectance storage unit 30 (step S6).

It is assumed, for example, that the spectral reflectance under the standard density conditions of a color patch of C 100% only is represented by $R_{C(std)}$, the spectral reflectance under the standard density conditions of a color patch of M 100% only is represented by $R_{M(std)}$, the varied-density spectral reflectance under given varied density conditions of a color patch of C 100% only is represented by $(R_{C(std)}+\Delta R_C)$, and the varied-density spectral reflectance under the given varied density conditions of a color patch of M 100% only is represented by $(R_{M(std)}+\Delta R_M)$. Then, the spectral reflectance $R_{CM}$ under the given varied density conditions of a color patch of C 100% and M 100% is expressed as follows:

$$R_{CM} = (R_{C(std)} + \Delta R_C) \cdot (R_{M(std)} + \Delta R_M) = \qquad (1)$$
$$R_{C(std)} \cdot R_{M(std)} + \{R_{M(std)} \cdot (R_{C(std)} + \Delta R_C) - R_{C(std)} \cdot R_{M(std)}\} +$$
$$\{R_{C(std)} \cdot (R_{M(std)} + \Delta R_M) - R_{C(std)} \cdot R_{M(std)}\} + \Delta R_C \cdot \Delta R_M$$

If the fourth term on the right side of equation (1) is small enough to be regarded as 0, then the first term on the right side represents the standard spectral reflectance produced when a color patch of halftone dot percentages of C 100% and M 100% is generated under the standard density conditions, the second term on the right side represents the difference of a varied spectral reflectance produced by varying the density of C 100% only of the color patch having halftone dot percentages of C 100% and M 100%, from the standard density conditions, and the third term on the right side represents the difference of a varied spectral reflectance produced by varying the density of M 100% only of the color patch having halftone dot percentages of C 100% and M 100%, from the standard density conditions.

Therefore, the spectral reflectance $R_{CM}$, caused when the densities of both the colors C, M are varied, can be determined by adding each difference produced when one of the densities of the colors C, M is fixed and the other is varied to the standard spectral reflectance $R_{C(std)} \cdot R_{M(std)}$ under the standard density conditions.

Figure 4:
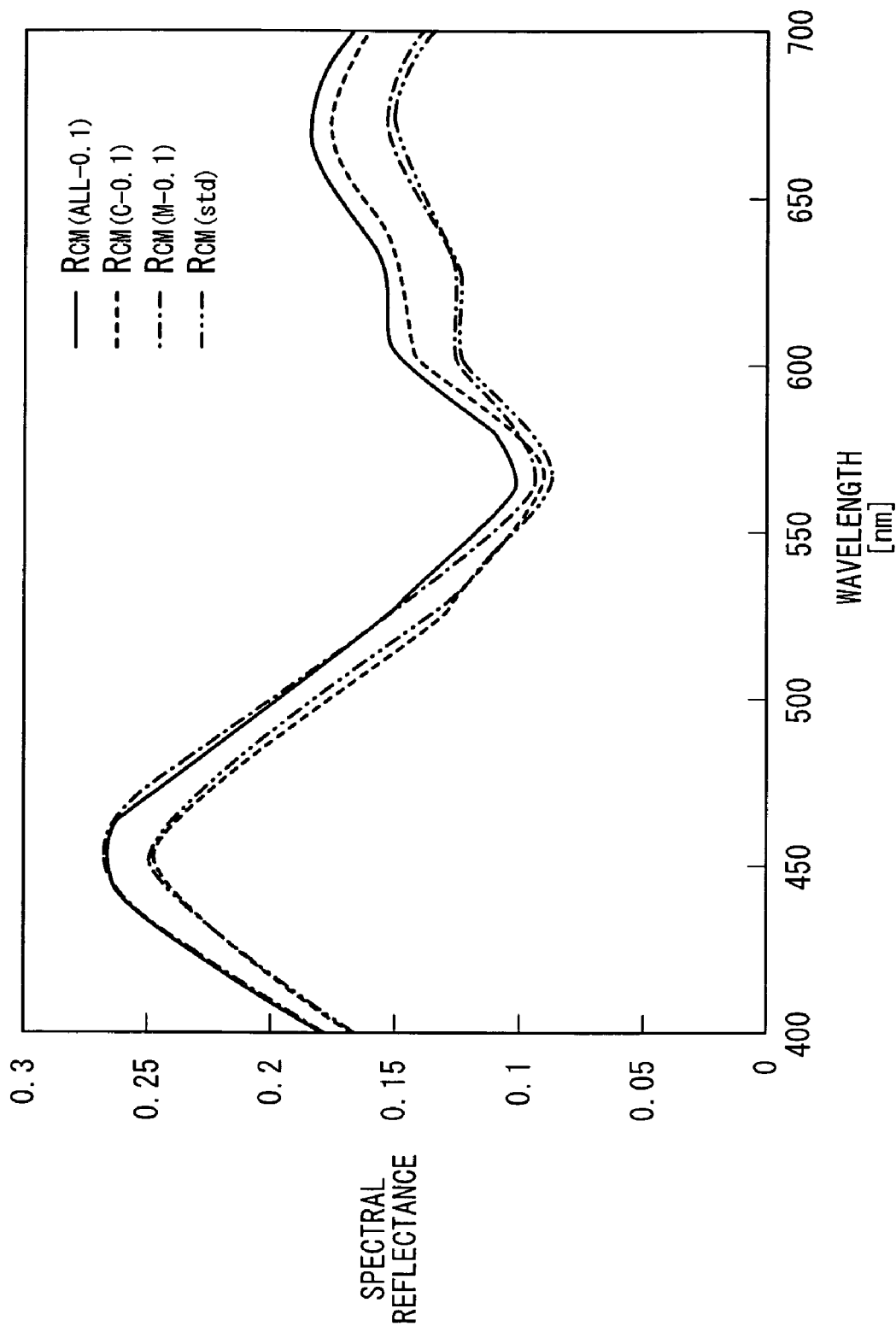
FIG. 4 is a diagram illustrative of spectral reflectances under both standard density conditions and varied density conditions.

FIG. 4 shows measured data of the spectral reflectance $R_{CM(std)}$ of a color patch having halftone dot percentages of C 100% and M 100% generated under the standard density conditions, the spectral reflectance $R_{CM(M-0.1)}$ of a color patch generated under varied density conditions in which C 100% is secured to the standard density, and M 100% only is changed (standard density −0.1), the spectral reflectance $R_{CM(std)}$ of a color patch generated under varied density conditions in which M 100% is secured to the standard density and C 100% only is changed (standard density −0.1), and the spectral reflectance $R_{CM(ALL-0.1)}$ of a color patch generated under varied density conditions in which both C 100% and M 100% are changed (standard density −0.1).

Figure 5:
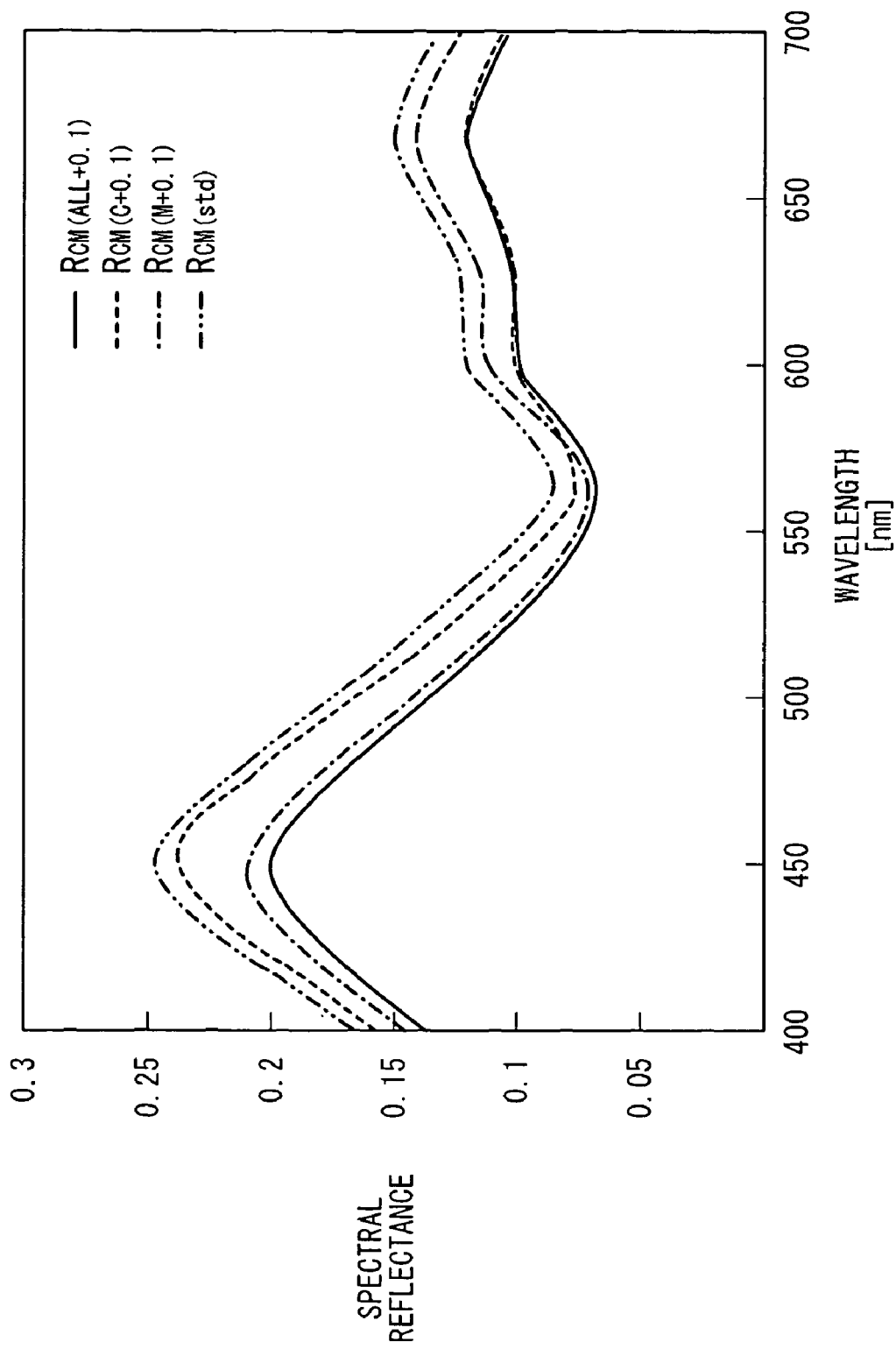
FIG. 5 is another diagram illustrative of spectral reflectances under both standard density conditions and varied density conditions.

FIG. 5 shows measured data of the spectral reflectance $R_{CM(std)}$ of a color patch having halftone dot percentages of C 100% and M 100% generated under standard density conditions, the spectral reflectance $R_{CM(M+0.1)}$ of a color patch generated under varied density conditions in which C 100% is secured to the standard density and M 100% only is changed (standard density +0.1), the spectral reflectance $R_{CM(C+0.1)}$ of a color patch generated under varied density conditions in which M 100% is secured to the standard density and C 100% only is changed (standard density +0.1), and the spectral reflectance $R_{CM(ALL+0.1)}$ of a color patch generated under varied density conditions in which both C 100% and M 100% are changed (standard density +0.1).

The spectral reflectance $R_{CM(ALL-0.1)}$ is determined approximately according to the following equation:

$$R_{CM(ALL-0.1)} = R_{CM(std)} + (R_{CM(C-0.1)} - R_{CM(std)}) + (R_{CM(M-0.1)} - R_{CM(std)})$$

And the spectral reflectance $R_{CM(ALL+0.1)}$ is determined approximately according to the following equation:

$$R_{CM(ALL+0.1)} = R_{CM(std)} + (R_{CM(C+0.1)} - R_{CM(std)}) + (R_{CM(M+0.1)} - R_{CM(std)})$$

From the above results, a target spectral reflectance R, which is a target varied-density spectral reflectance at the time when C, M, M, K are changed to an arbitrary density under desired varied density conditions, is determined according to the following equation, which is based on the above equation (1):

$$R = R_{std} + R_{\Delta C} + R_{\Delta M} + R_{\Delta Y} + R_{\Delta K} \quad (2)$$

where $R_{std}$ represents a standard spectral reflectance, $R_{\Delta C}$ represents a spectral reflectance difference at the time the density of C only is varied, $R_{\Delta M}$ represents a spectral reflectance difference at the time the density of M only is varied, $R_{\Delta Y}$ represents a spectral reflectance difference at the time the density of Y only is varied, and $R_{\Delta K}$ represents a spectral reflectance difference at the time the density of K only is varied.

The spectral reflectance difference calculator 32 calculates, for the respective varied density conditions, differences between the standard spectral reflectances $R_{std}$ of the color patches stored in the standard spectral reflectance storage unit 28 and the corresponding varied-density spectral densities of the color patches stored in the varied-density spectral reflectance storage unit 30 (step S7), and stores the differences under the respective varied density conditions as spectral reflectance differences $R_{\Delta C}$, $R_{\Delta M}$, $R_{\Delta Y}$, $R_{\Delta K}$ in the spectral reflectance difference storage unit 34 (step S8).

After completion of the above preparatory process, a print predicting profile 20 is generated at a time when the standard density conditions are changed to arbitrary varied density conditions.

The density variation setting unit 36 sets desired density variations for the colors C, M, Y, K (step S9). Then, the target spectral reflectance calculator 38 calculates the target spectral reflectance R according to equation (2), using the standard spectral reflectances $R_{std}$ stored in the standard spectral reflectance storage unit 28 and the spectral reflectance differences $R_{\Delta C}$, $R_{\Delta M}$, $R_{\Delta Y}$, $R_{\Delta K}$ stored in the spectral reflectance difference storage unit 34 (step S10).

For changing only the density variation, with only the standard density of C being set, only the spectral reflectance difference $R_{\Delta C}$ corresponding to the set density variation is added to the standard spectral reflectance $R_{std}$, while the target spectral reflectance R is calculated with the other spectral reflectance differences $R_{\Delta M}$, $R_{\Delta Y}$, $R_{\Delta K}$ being set to 0. For changing only the density variations with the respective standard densities of C and M being set, the spectral reflectance differences $R_{\Delta C}$, $R_{\Delta M}$ corresponding to the set density variations are added to the standard spectral reflectance $R_{std}$, while the target spectral reflectance R is calculated with the other spectral reflectance differences $R_{\Delta Y}$, $R_{\Delta K}$ being set to 0.

If only the density variations with the reference densities of all four colors C, M, Y, K being set are changed, then the target spectral reflectance R can be calculated according to equation (2). However, if the color patches to be processed for calculating the target spectral reflectance R are in three colors C, M, Y, then the spectral reflectance difference $R_{\Delta K}$ ideally should be 0 regardless of changes in the density of K. Actually, the spectral reflectance difference $R_{\Delta K}$ may not be 0 due to printing and measuring variations.

If only the density variations with the reference densities of all four colors C, M, Y, K being set are changed, even in this case, it is therefore desirable to calculate the target spectral reflectance R with the spectral reflectance difference $R_{\Delta K}$ being set to 0, in the event that the color patches to be processed for calculating the target spectral reflectance R are in three colors C, M, Y. Similarly, in the event that the color patches to be processed for calculating the target spectral reflectance R are in two colors C, M, it is desirable to calculate the target spectral reflectance R with the spectral reflectance differences $R_{\Delta Y}$, $R_{\Delta K}$ being set to 0.

When the spectral reflectance differences $R_{\Delta C}$, $R_{\Delta M}$, $R_{\Delta Y}$, $R_{\Delta K}$ are generated based on the varied density conditions being adjusted such that the spectral reflectance differences are, for example, −0.2, −0.1, +0.1, and +0.2 smaller or greater than the standard densities under the standard density conditions in terms of optical densities, and the set density variation is +0.15, the spectral reflectance differences $R_{\Delta C}$, $R_{\Delta M}$, $R_{\Delta Y}$, $R_{\Delta K}$ with respect to the density variation of +0.15 can be determined by interpolating the spectral reflectance differences $R_{\Delta C}$, $R_{\Delta M}$, $R_{\Delta Y}$, $R_{\Delta K}$ for the density variation of +0.1 and the spectral reflectance differences $R_{\Delta C}$, $R_{\Delta M}$, $R_{\Delta Y}$, $R_{\Delta K}$ for the density variation of +0.2. The spectral reflectance differences may be interpolated by any known process, such as linear interpolation, spline interpolation, polynomial approximation, or the like.

Then, the print predicting profile generator 40 calculates colorimetric values X, Y, Z or calorimetric values L*, a*, b*, for example, from the target spectral reflectance R thus determined (step S11), and generates a print predicting profile 20, which represents a relationship between the colorimetric values X, Y, Z or the colorimetric values L*, a*, b* and the image data C1, M1, Y1, K1 used to generate the color chart C1 (step S12). The print predicting profile 20, which is generated depending on the desired density variation, is set in the color converter 16.

Figure 6:
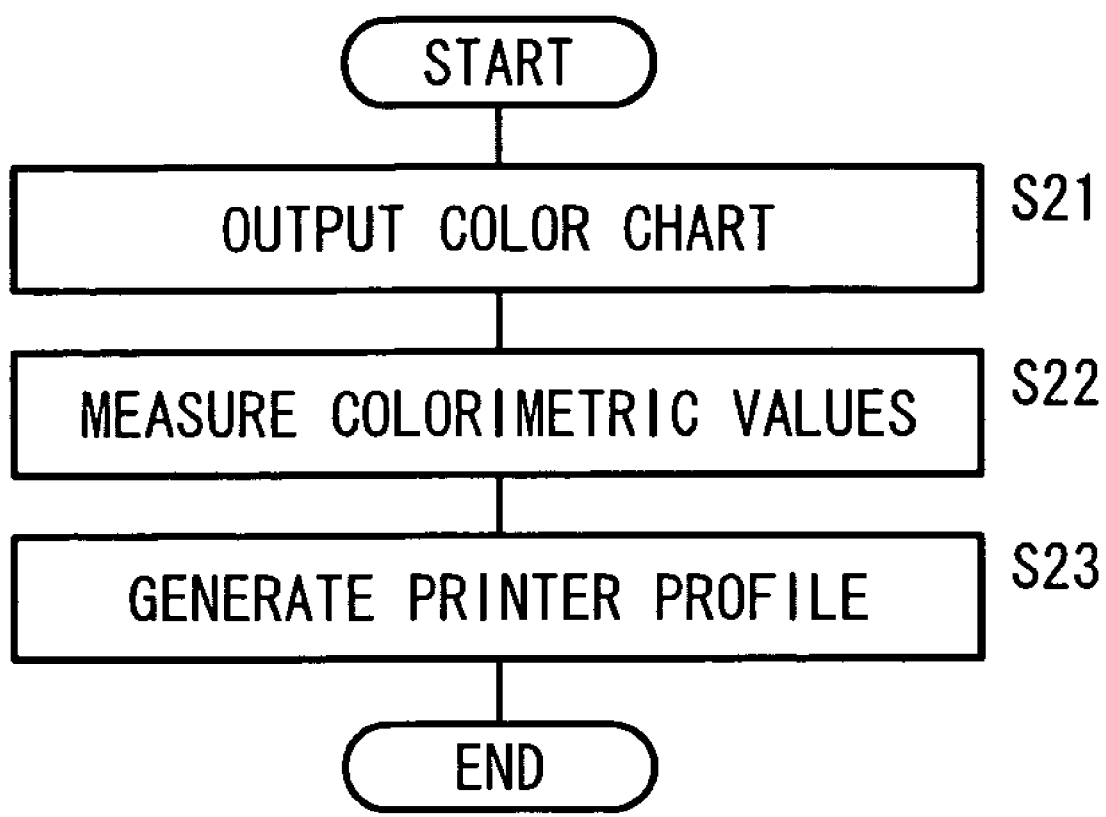
FIG. 6 is a flowchart of a sequence for generating a printer profile.

The color converter 16 supplies image data C2, M2, Y2, K2 to the printer 18, which outputs a color chart C2 made up of a plurality of color patches onto a recording medium (step S21 in FIG. 6), in the same manner as used for printing the color chart C1 (step S1).

The color patches on the output color chart C2 are measured for colorimetric values, e.g., calorimetric values X, Y, Z or colorimetric values L*, a*, b*, by the calorimeter 42 (step S22). The printer profile generator 44 generates a printer profile 22, which represents a relationship between the colorimetric values, e.g., the calorimetric values X, Y, Z or the colorimetric values L*, a*, b*, and the image data C2, M2, Y2, K2 used to generate the color chart C2 (step S23). The generated printer profile 22 is then set in the color converter 16. Since the printer profile 22 does not depend on varied density conditions, the printer profile 22 may be generated only once, unless the conditions of the printer 18 are changed.

After the print predicting profile 20 and the printer profile 22 have been established as described above, the printer 18 generates a proof sheet P2 for a print P1 to be produced from desired image data C1, M1, Y1, K1.

Figure 7:
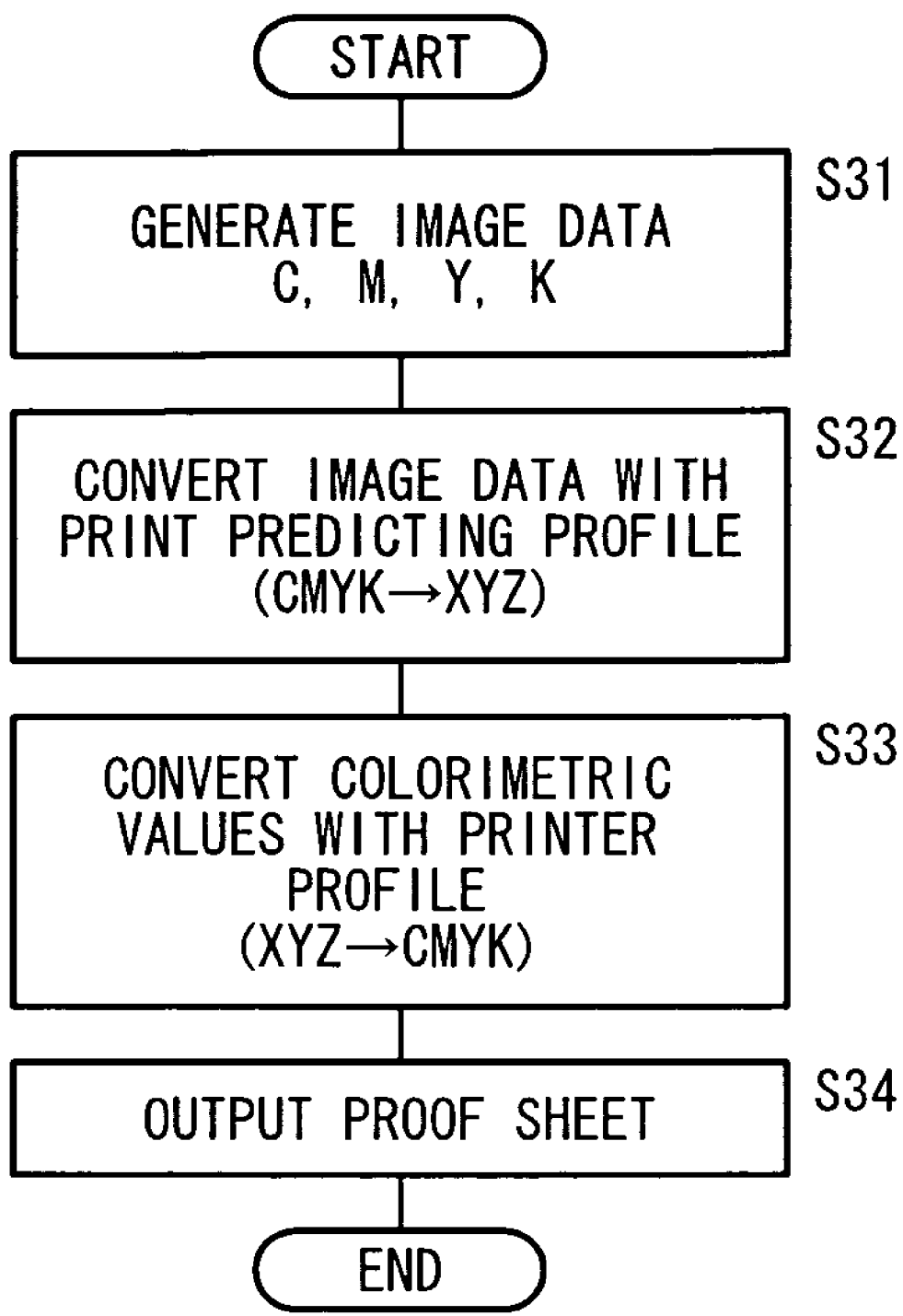
FIG. 7 is a flowchart of a sequence for generating a proof sheet.

Specifically, the editing device 12 generates desired image data C1, M1, Y1, K1 and supplies the generated image data C1, M1, Y1, K1 to the color converter 16 (step S31 in FIG. 7). In the color converter 16, the print predicting profile 20 converts the image data C1, M1, Y1, K1 into device-independent calorimetric values, e.g., colorimetric values X, Y, Z or calorimetric values L*, a*, b* (step S32). The print predicting profile 20 is adjusted such that each of the colors C, M, Y, K has a desired target density at a 100% halftone dot percentage.

Then, the printer profile 22 converts the calorimetric values X, Y, Z or the calorimetric values L*, a*, b* into image data C2, M2, Y2, K2 depending on the output characteristics of the printer 18 (step S33). The printer 18 then produces a proof sheet P2 based on the image data C2, M2, Y2, K2 (step S34).

The print predicting profile 20 and the printer profile 22 may be combined into a single profile, and the image data C2, M2, Y2, K2 may also be determined directly from the image data C1, M1, Y1, K1 using the single profile.

Figure 8:
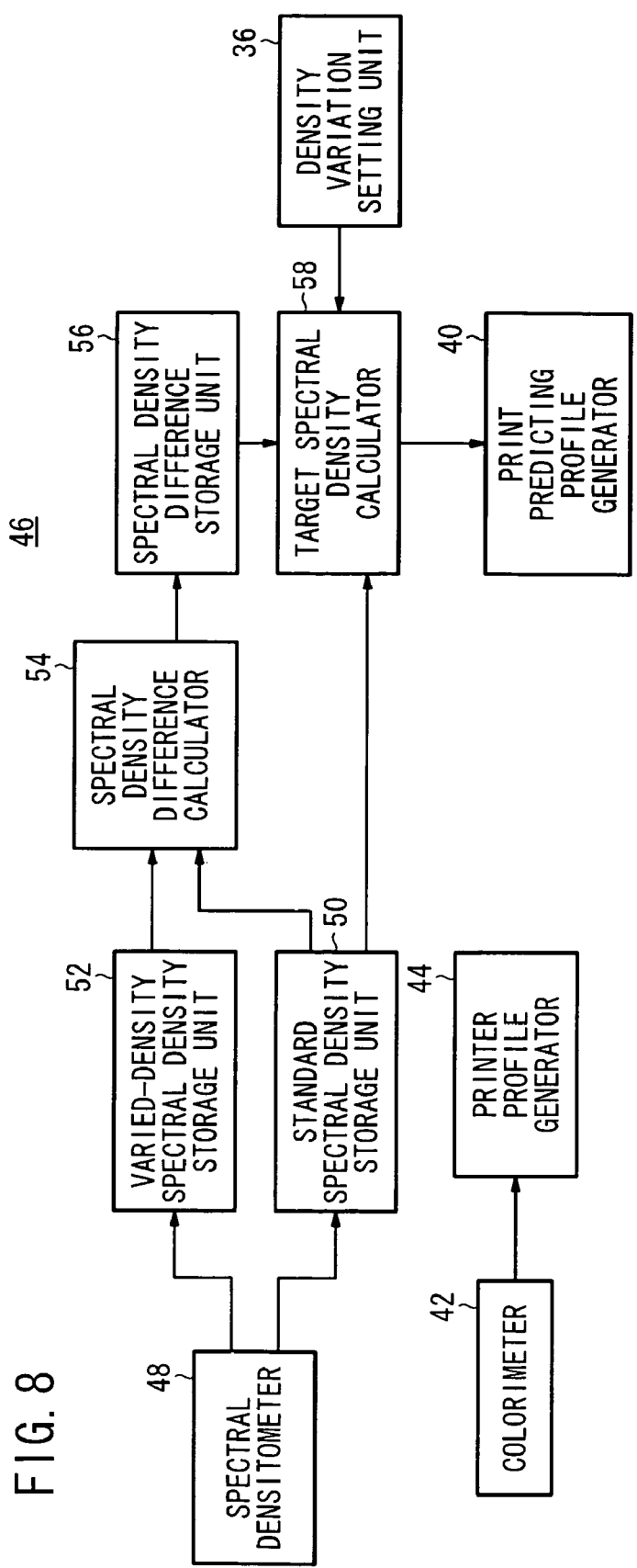
FIG. 8 is a block diagram of a profile generator according to another embodiment of the present invention.

According to another embodiment of the present invention, the print predicting profile 20 and the printer profile 22 may be generated by the profile generator 46 shown in FIG. 8. Those parts of the profile generator 46 which are identical to those of the profile generator 24 shown in FIG. 2 are denoted by identical reference characters, and such features shall not be described in detail below.

As shown in FIG. 8, the profile generator 46 includes a spectral densitometer 48 for measuring spectral densities of a printed color chart C1. The spectral densitometer 48 measures standard spectral densities, which represent the spectral densities of a color chart C1 generated under standard density conditions. The measured standard spectral densities are stored in a standard spectral density storage unit 50. The spectral densitometer 48 also measures varied-density spectral densities, which represent the spectral densities of a color chart C1 generated under given varied density conditions. The measured varied-density spectral densities are stored in a varied-density spectral density storage unit 52.

The profile generator 46 also includes a spectral density difference calculator 54 that calculates, for each of the varied density conditions, differences between the standard spectral densities of respective color patches stored in the standard spectral density storage unit 50 and corresponding varied-density spectral densities of the color patches stored in the varied-density spectral density storage unit 52. Further, the profile generator 46 includes a spectral density difference storage unit 56 for storing the calculated spectral density differences.

The profile generator 46 further includes a target spectral density calculator 58 for calculating target spectral densities using the standard spectral densities and the spectral density differences, when varied density conditions are established for 100% halftone dot percentages of the colors C, M, Y, K. If the density variations set by the density variation setting unit 36 are different from the density variations under the varied density conditions, then the target spectral density calculator 58 may calculate target spectral densities, using interpolated values produced by interpolating spectral density differences corresponding to density variations stored in the spectral density difference storage unit 56.

Then, the print predicting profile generator 40 calculates calorimetric values, such as calorimetric values X, Y, Z or colorimetric values L*, a*, b*, for example, from the target spectral densities, and generates a print predicting profile 20.

It is assumed, for example, that the spectral density under standard density conditions of a color patch of C 100% only is represented by $D_{C(std)}$, the spectral density under the standard density conditions of a color patch of M 100% only is represented by $D_{M(std)}$, the varied-density spectral density under given varied density conditions of a color patch of C 100% only is represented by $(D_{C(std)}+\Delta D_C)$, and the varied-density spectral density under the given Varied density conditions of a color patch of M 100% only is represented by $(D_{M(std)}+\Delta D_M)$. Then, the spectral density $D_{CM}$ under the given varied density conditions of a color patch of C 100% and M 100% is expressed as follows:

$$D_{CM} = (D_{C(std)} + \Delta D_C) + (D_{M(std)} + \Delta D_M) = (D_{C(std)} + D_{M(std)}) + \quad (3)$$
$$[\{(D_{C(std)} + D_{M(std)}) + \Delta D_C)\} - (D_{C(std)} + D_{M(std)})] +$$
$$[\{(D_{C(std)} + D_{M(std)}) + \Delta D_M)\} - (D_{C(std)} + D_{M(std)})]$$

The first term on the right side of equation (3) represents a standard spectral density produced when a color patch having halftone dot percentages of C 100% and M 100% is generated under standard density conditions, the second term on the right side represents the difference of a varied spectral density, produced by varying the density of C 100% only of the color patch having halftone dot percentages of C 100% and M 100%, from the standard density conditions, and the third term on the right side represents the difference of a varied spectral density, produced by varying the density of M 100% only of the color patch having halftone dot percentages of C 100% and M 100%, from the standard density conditions.

Therefore, as with the spectral reflectance $R_{CM}$, the spectral density $D_{CM}$ caused when the densities of both colors C, M are varied can be determined by adding the difference, which is produced when one of the densities of the colors C, M is fixed and the other varied, to the standard spectral density $(D_{C(std)}+D_{M(std)})$ under the standard density conditions. Unlike equation (1) for determining the spectral reflectance $R_{CM}$, however, the spectral density DCM can be determined with high accuracy since equation (3) is free of terms representing the error $\Delta R_C \cdot \Delta R_M$.

As a result, a target spectral density R, which is a target varied-density spectral density at a time when C, M, M, K are changed to an arbitrary density under desired varied density conditions, is determined according to the following equation:

$$D = D_{std} + D_{\Delta C} + D_{\Delta M} + D_{\Delta Y} + D_{\Delta K} \quad (4)$$

based on the above equation (3), where $D_{std}$ represents a standard spectral density, $D_{\Delta C}$ represents a spectral density difference at a time when the density of C only is varied, $D_{\Delta M}$ represents a spectral density difference at a time when the density of M only is varied, $D_{\Delta Y}$ represents a spectral density difference at a time when the density of Y only is varied, and $D_{\Delta K}$ represents a spectral density difference at a time when the density of K only is varied.

In the event that the color patches to be processed for calculating the target spectral density R are in three colors C, M, Y, it is desirable to calculate the target spectral density R with the spectral density difference $D_{\Delta K}$ being set to 0. Similarly, in the event that the color patches to be processed for calculating the target spectral density R are in two colors C, M, it is desirable to calculate the target spectral density R with the spectral density differences $D_{\Delta Y}$, $D_{\Delta K}$ both being set to 0.

Figure 9:
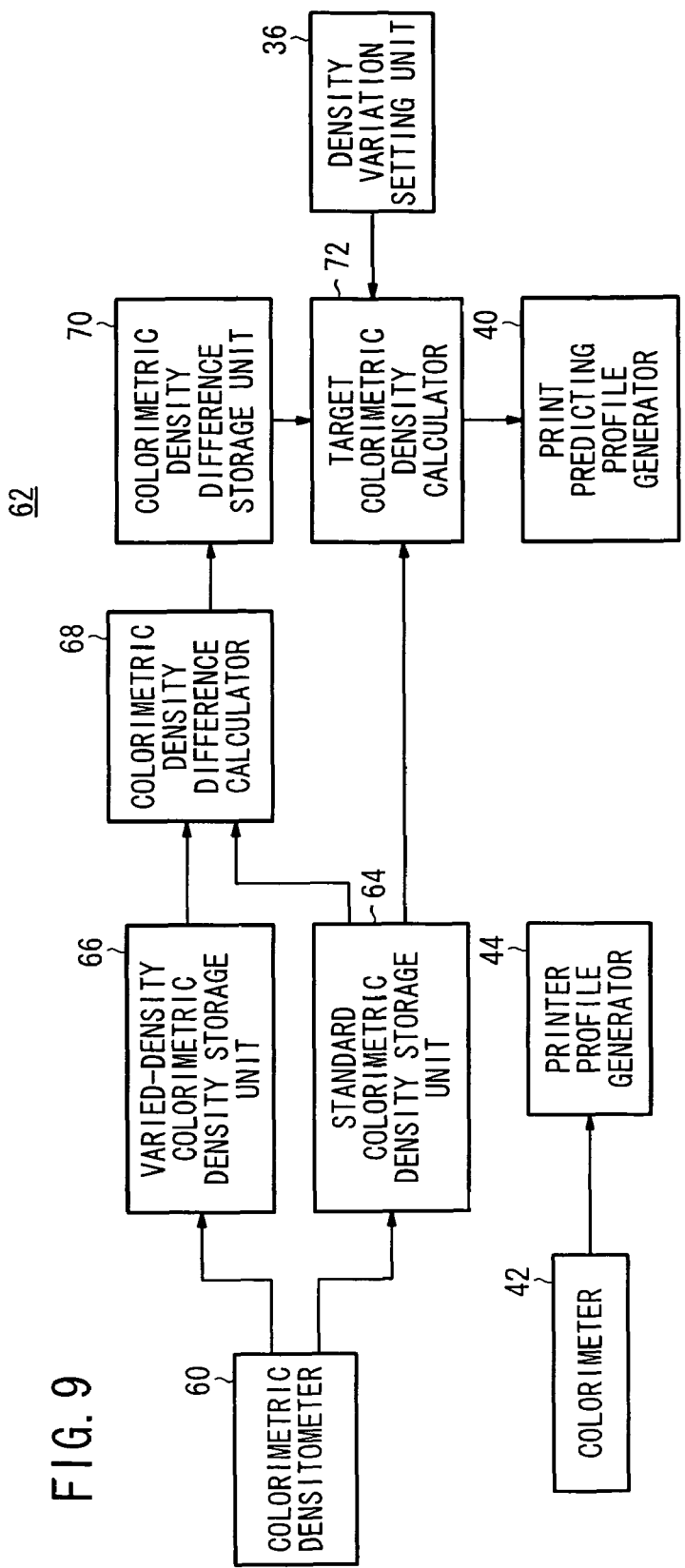
FIG. 9 is a block diagram of a profile generator according to still another embodiment of the present invention.

FIG. 9 shows a profile generator 62 according to still another embodiment of the present invention. The profile generator 62 includes a calorimetric densitometer 60, which is used instead of the spectral densitometer 48, in the profile generator 46 shown in FIG. 8. Those parts of the profile generator 62 that are identical to the profile generator 46 shown in FIG. 8 are denoted by identical reference characters, and such features shall not be described in detail below.

The calorimetric densitometer 60 measures the standard calorimetric densities of a color chart C1 generated under standard density conditions. The measured standard calorimetric densities are stored in a standard calorimetric density storage unit 64. The colorimetric densitometer 60 also measures varied-density calorimetric densities, which represent the colorimetric densities of a color chart C1 generated under given varied density conditions. The measured varied-density colorimetric densities are stored in a varied-density colorimetric density storage unit 66.

The profile generator 62 includes a colorimetric density difference calculator 68 that calculates, for each of the varied density conditions, differences between the standard colorimetric densities of respective color patches stored in the standard calorimetric density storage unit 64 and corresponding varied-density colorimetric densities of color patches stored in the varied-density colorimetric density storage unit 66. The profile generator 62 also includes a colorimetric density difference storage unit 70 for storing the calculated calorimetric density differences.

The profile generator 62 further includes a target colorimetric density calculator 72 for calculating target colorimetric densities, using the standard colorimetric densities and calorimetric density differences when varied density conditions are established for 100% halftone dot percentages of the colors C, M, Y, K. If the density variations set by the density variation setting unit 36 are different from the density variations under the varied density conditions, then the target colorimetric density calculator 72 can calculate target colorimetric densities using interpolated values, produced by interpolating colorimetric density differences corresponding to the density variations stored in the calorimetric density difference storage unit 70.

The print predicting profile generator 40 calculates calorimetric values, such as tristimulus values X, Y, Z or the like, from the target calorimetric densities, and generates a print predicting profile 20.

Figure 10:
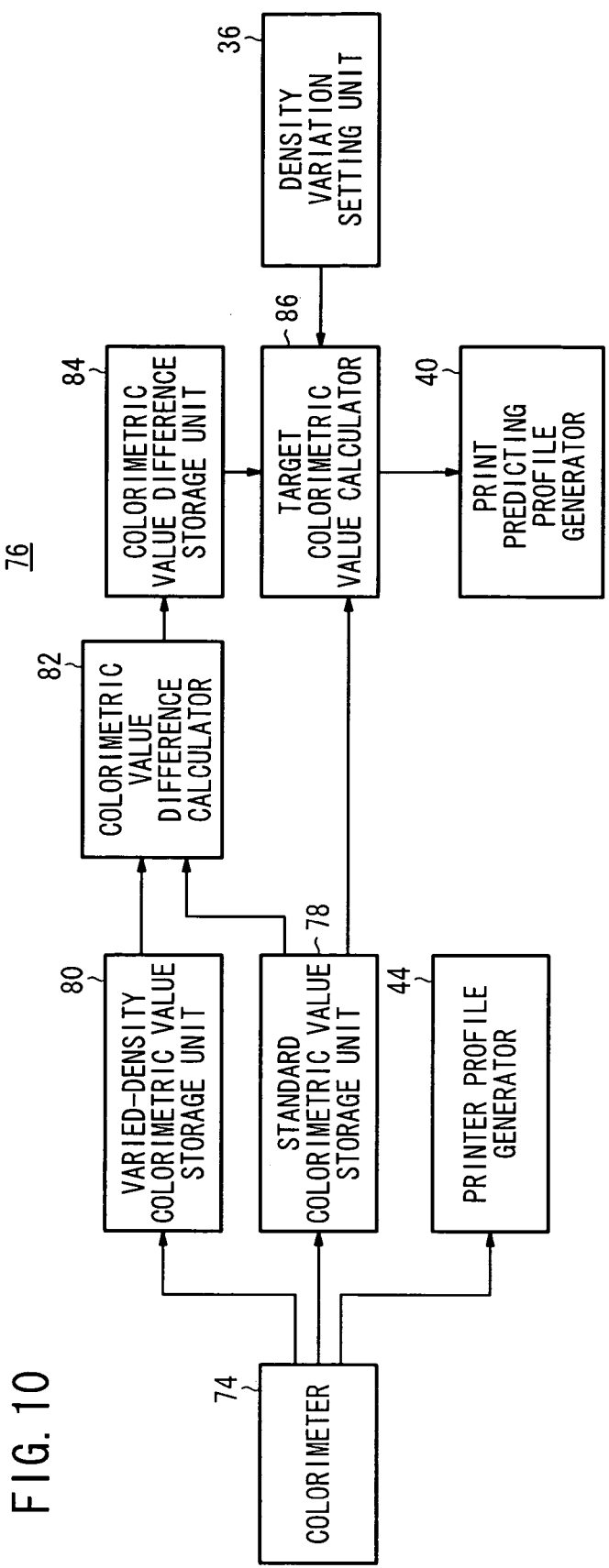
FIG. 10 is a block diagram of a profile generator according to yet still another embodiment of the present invention.

FIG. 10 shows a profile generator 76 according to yet another embodiment of the present invention. The profile generator 76 includes a colorimeter 74, which is used instead of the spectral densitometer 48 in the profile generator 46 shown in FIG. 8. Those parts of the profile generator 76 that are identical to the profile generator 46 shown in FIG. 8 are denoted by identical reference characters, and such features shall not be described in detail below.

The calorimeter 74 measures standard colorimetric values, e.g., colorimetric values X, Y, Z or colorimetric values L*, a*, b*, of a color chart C1 generated under standard density conditions. The measured standard colorimetric values are stored in a standard colorimetric value storage unit 78. The colorimeter 74 also measures varied-density colorimetric values, which represent colorimetric values of a color chart C1 generated under given varied density conditions. The measured varied-density colorimetric values are stored in a varied-density colorimetric value storage unit 80.

The profile generator 76 includes a colorimetric value difference calculator 82 for calculating, for each of the varied value conditions, differences between the standard calorimetric values of respective color patches stored in the standard colorimetric value storage unit 78 and corresponding varied-value colorimetric values of the color patches stored in the varied-density colorimetric value storage unit 80. Further, the profile generator 76 includes a calorimetric value difference storage unit 84 for storing the calculated colorimetric value differences.

The profile generator 76 further includes a target colorimetric value calculator 86 for calculating target colorimetric values, using the standard colorimetric values and the colorimetric value differences when density variations are established for 100% halftone dot percentages of the colors C, M, Y, K. If the density variations set by the density variation setting unit 36 are different from the density variations under the varied density conditions, then the target colorimetric value calculator 86 can calculate target colorimetric values using interpolated values, which are produced by interpolating colorimetric value differences corresponding to density variations stored in the colorimetric value difference storage unit 84.

The print predicting profile generator 40 generates a print predicting profile 20 from the target colorimetric densities.

In the descriptions of the above embodiments, a print predicting profile 20 is determined, which corresponds to density variations from the standard densities that have been defined by the user in advance. However, intermediate densities between maximum and minimum densities of the colors C, M, Y, K printable by the printing press 14 may be established as standard densities, wherein a print predicting profile 20 is generated based on a standard color chart, which is generated based on the intermediate densities and a variation color chart. The intermediate densities may be established as averages of the maximum and minimum densities, or arbitrary densities between such maximum and minimum densities.

Since the colors of the print P1 produced by the printing press 14 vary depending on printing conditions including the print sheet, inks, dot gain, etc., which are used for printing the print P1, the color converter 16 preferably performs a color converting process in view of changes in the printing conditions.

Figure 11:
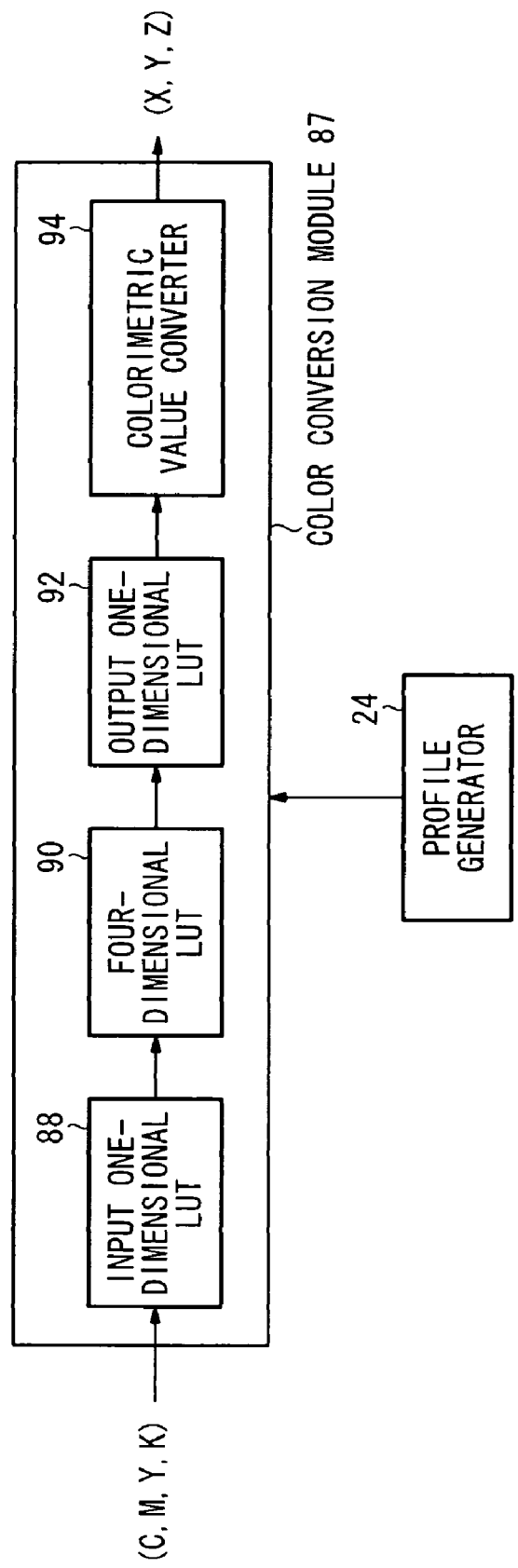
FIG. 11 is a block diagram illustrating a modular configuration of the print predicting profile.

FIG. 11 shows a color conversion module 87, which serves as part of the color converter 16, for converting image data C, M, Y, K into colorimetric values X, Y, Z or the like, while using a print predicting profile 20 that is generated by the profile generator 24 based on ICC standards. The color conversion module 87 comprises an input one-dimensional LUT (lookup table) 88 for converting the image data C, M, Y, K into image data C, M, Y, K according to a print predicting profile that reflects a dot gain printing condition, a four-dimensional LUT 90 for converting the image data C, M, Y, K into colorimetric values X, Y, Z or the like according to a print predicting profile that reflects a printing condition of the inks, an output one-dimensional LUT 92 for converting the calorimetric values X, Y, Z or the like into desired colorimetric values X, Y, Z or the like according to a print predicting profile, and a calorimetric value converter 94 for converting the colorimetric values X, Y, Z or the like into calorimetric values X, Y, Z or the like according to a print predicting profile that reflects printing conditions of the print sheet.

A process carried out by the color conversion module 87 when the print sheet is changed will be described below.

Colorimetric values output from the four-dimensional LUT 90, based on a print predicting profile according to ICC standards, are represented by relative values for equalizing the color of the print sheet to a standard white color. Specifically, the four-dimensional LUT 90 converts the image data C, M, Y, K of the print sheet (C=M=Y=K=0) into colorimetric values X, Y, Z of a standard light source (D50 light source), or converts the image data C, M, Y, K of the print sheet (C=M=Y=K=0) into calorimetric values $L^*=100$, $a^*=b^*=0$.

The calorimetric value converter 94 converts the relative values, referred to above, into absolute values depending on the print sheet that is used, according to colorimetric values X, Y, Z or the like (color information) of the print sheet, and in accordance with the print predicting profile generated by the profile generator 24. Specifically, the absolute calorimetric values of the print sheet under a standard light source (D50 light source), for example, are determined from the relative colorimetric values supplied from the output one-dimensional LUT 92, the sheet calorimetric values of the print sheet under the standard light source (D50 light source) according to the print predicting profile, and the light source colorimetric values of the standard light source (D50 light source), as follows:

Absolute colorimetric values=relative colorimetric values×sheet colorimetric values+light source colorimetric values.

If the calorimetric values input to the colorimetric value converter 94 are relative colorimetric values $L^*$, $a^*$, $b^*$, then the colorimetric values are converted into relative calorimetric values X, Y, Z, which are then converted into absolute colorimetric values X, Y, Z according to the above equation.

When the inks used and the dot gain remain unchanged, it is possible to obtain calorimetric values X, Y, Z or the like depending on the print sheet, without the need to print a color chart C1, simply by giving the calorimetric values X, Y, Z or the like of the print sheet as a print predicting profile. According to ICC standards, the colorimetric values of the print sheet are provided as media white dot tags.

A process carried out by the color conversion module 87 when the dot gain is changed shall be described below.

The dot gain varies when blankets of the printing press 14 are deteriorated or replaced, and also varies depending on temperature and humidity in the vicinity of the printing press 14. If the inks that are used remain unchanged, then it is possible to obtain image data C, M, Y, K, which takes into account the variation in the dot gain, by reflecting such variation of the dot gain in the input one-dimensional LUT 88.

Based on a relationship between one of the image data C, M, Y, K of the color chart C1 and one of the colorimetric values X, Y, Z or the like, the profile generator 24 generates image data C, M, Y, K after the dot gain thereof has been varied as a print predicting profile, by printing and calorimetrically measuring the color chart C1 after the dot gain thereof has been varied, and the input one-dimensional LUT 88 is corrected using the print predicting profile.

Figure 12:
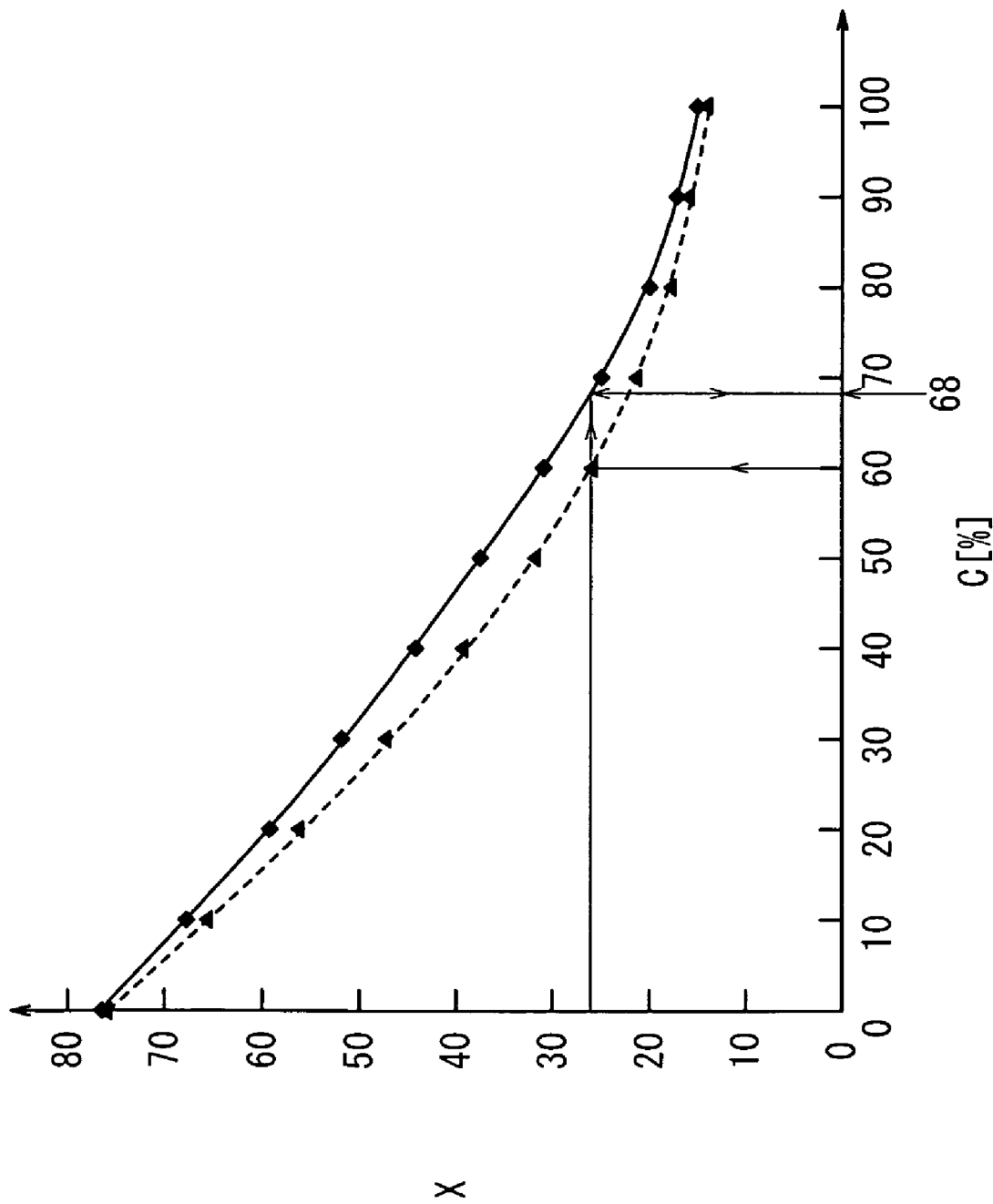
FIG. 12 is a diagram showing a relationship between the halftone dot percentage (%) and colorimetric values X of image data C, before and after the dot gain thereof varies.

FIG. 12 shows the relationship between halftone dot percentages and colorimetric values X of image data C before and after the dot gain is varied. In FIG. 12, the solid-line curve represents the relationship before the dot gain varies, and the dotted-line curve represents the relationship after the dot gain varies. The dot gain does not vary if the halftone dot percentage is 0% or 100%. Measurement errors can be minimized by selecting the image data C, M, Y, K and the colorimetric values X, Y, Z that undergo the greatest changes. For example, it is preferable to select relationships between the image data C and the calorimetric value X, the image data M and the colorimetric value Y, the image data Y and the calorimetric value Z, and the image data K and the colorimetric value Y.

Figure 13:
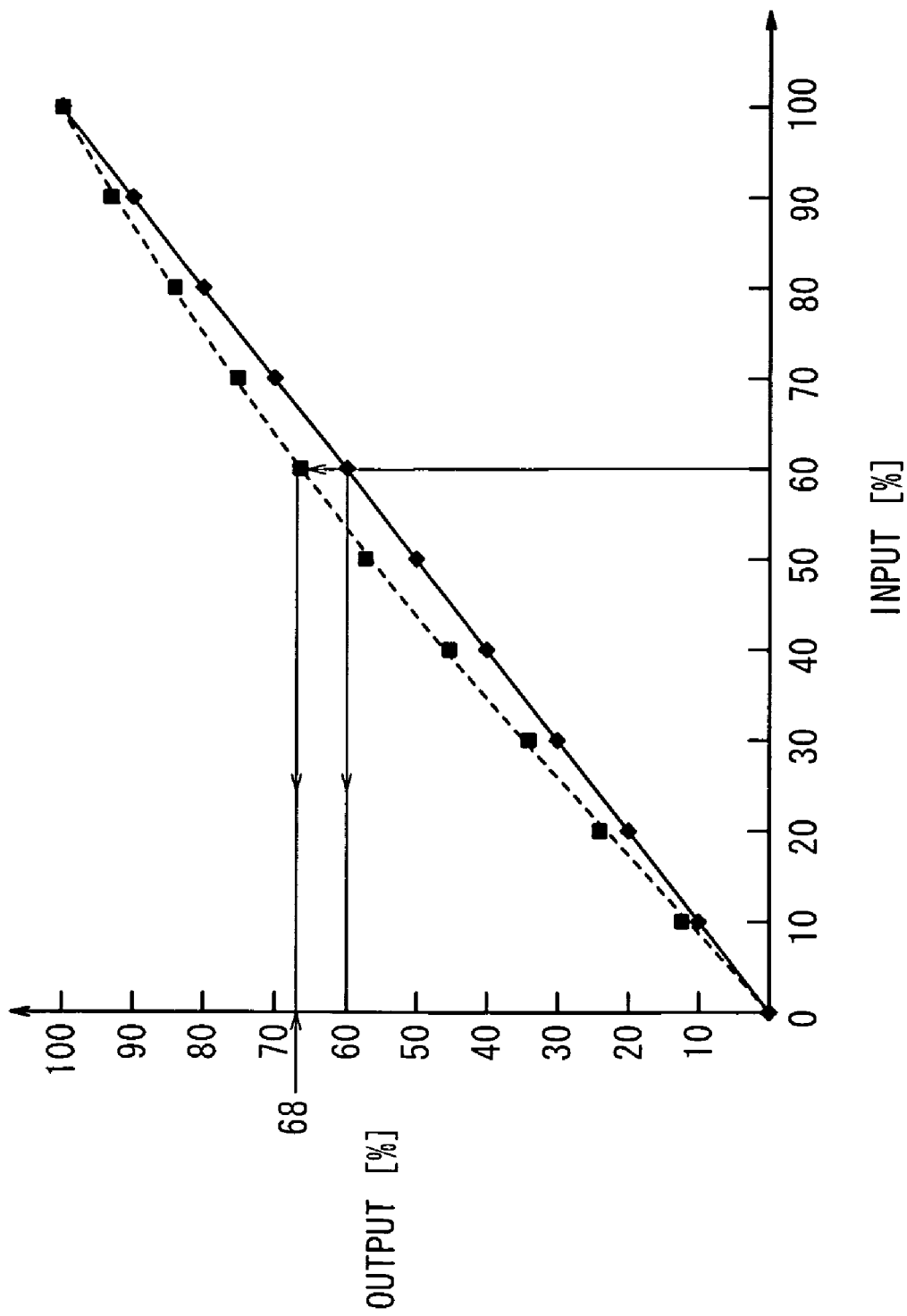
FIG. 13 is a diagram showing a corrected dot gain changing one-dimensional lookup table (LUT)

For example, in FIG. 12, when the halftone dot percentage of the image data C is 60%, the dot percentage of the image data C before the dot gain varies for obtaining a colorimetric value X after the dot gain varies becomes 68%. Therefore, if the input one-dimensional LUT 88 is corrected to output the input image data C of 60% as image data C of 68%, then image data C can be obtained taking into account the effect of the dot gain. FIG. 13 shows the input one-dimensional LUT 88, which is corrected based on these relationships. In FIG. 13, the solid-line curve represents the input one-dimensional LUT 88 before the dot gain varies, and the dotted-line curve represents the input one-dimensional LUT 88 after the dot gain is varied.

A process carried out by the color conversion module 87 when the inks are changed shall be described below.

The printing press 14, which is set to the standard density conditions, prints a color chart C1, and then colorimetric values, e.g., colorimetric values X, Y, Z, of the color chart C1, are measured by the colorimeter. The profile generator 24 determines, as a print predicting profile, the relationship of colorimetric values X1, Y1, Z1 to the image data C, M, Y, K of the color chart C1. The data stored in the standard calorimetric value storage unit 78 shown in FIG. 10 may be used as this relationship. Then, after the inks of the standard density conditions have been changed, the profile generator 24 similarly determines, as a print predicting profile, the relationship of colorimetric values X2, Y2, Z2 to the image data C, M, Y, K of the color chart C1.

Differences $\Delta X$, $\Delta Y$, $\Delta Z$ between the colorimetric values X1, Y1, Z1 and the colorimetric values X2, Y2, Z2 are determined, and the relationship between such differences $\Delta X$, $\Delta Y$, $\Delta Z$ and the image data C, M, Y, K is used to define a differential lookup table. Using the differential lookup table, the profile generator 24 corrects a print predicting profile established under given varied density conditions, and generates a four-dimensional LUT 90 for converting the image data C, M, Y, K into colorimetric values X, Y, Z, using the corrected print predicting profile. Rather than correcting the print predicting profile, the profile generator 24 may also correct the colorimetric values X, Y, Z that are output from the four-dimensional LUT 90 under standard density conditions, which have already been generated.

In this manner, a desired four-dimensional LUT 90 can be produced simply by printing and calorimetrically measuring a minimally required color chart C1. If both the inks and the print sheet are changed and the differences $\Delta X$, $\Delta Y$, $\Delta Z$ are determined, then it is possible to produce a four-dimensional LUT 90 taking into account both the inks and the print sheet.

Figure 14:
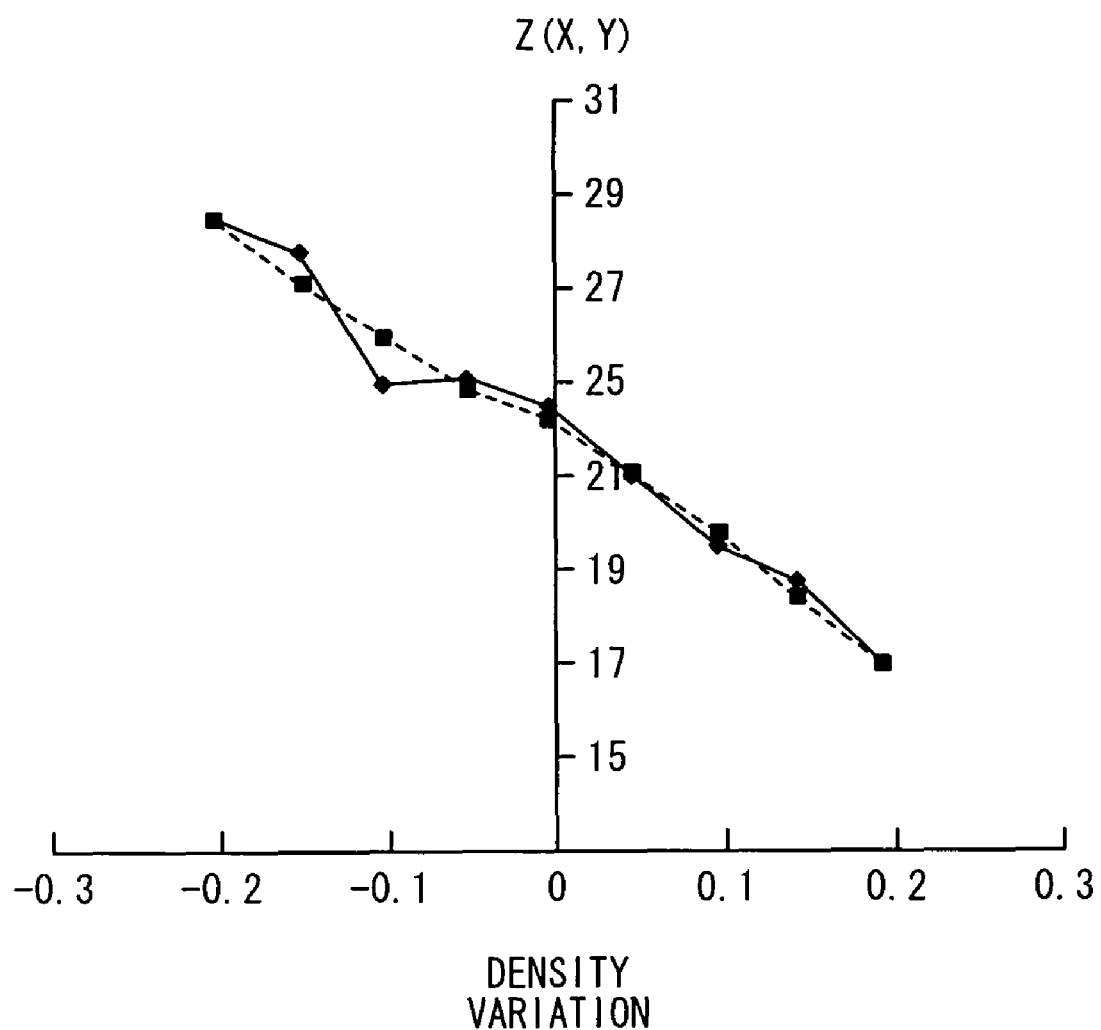
FIG. 14 is a diagram showing a relationship between density variations and colorimetric values.
Figure 15:
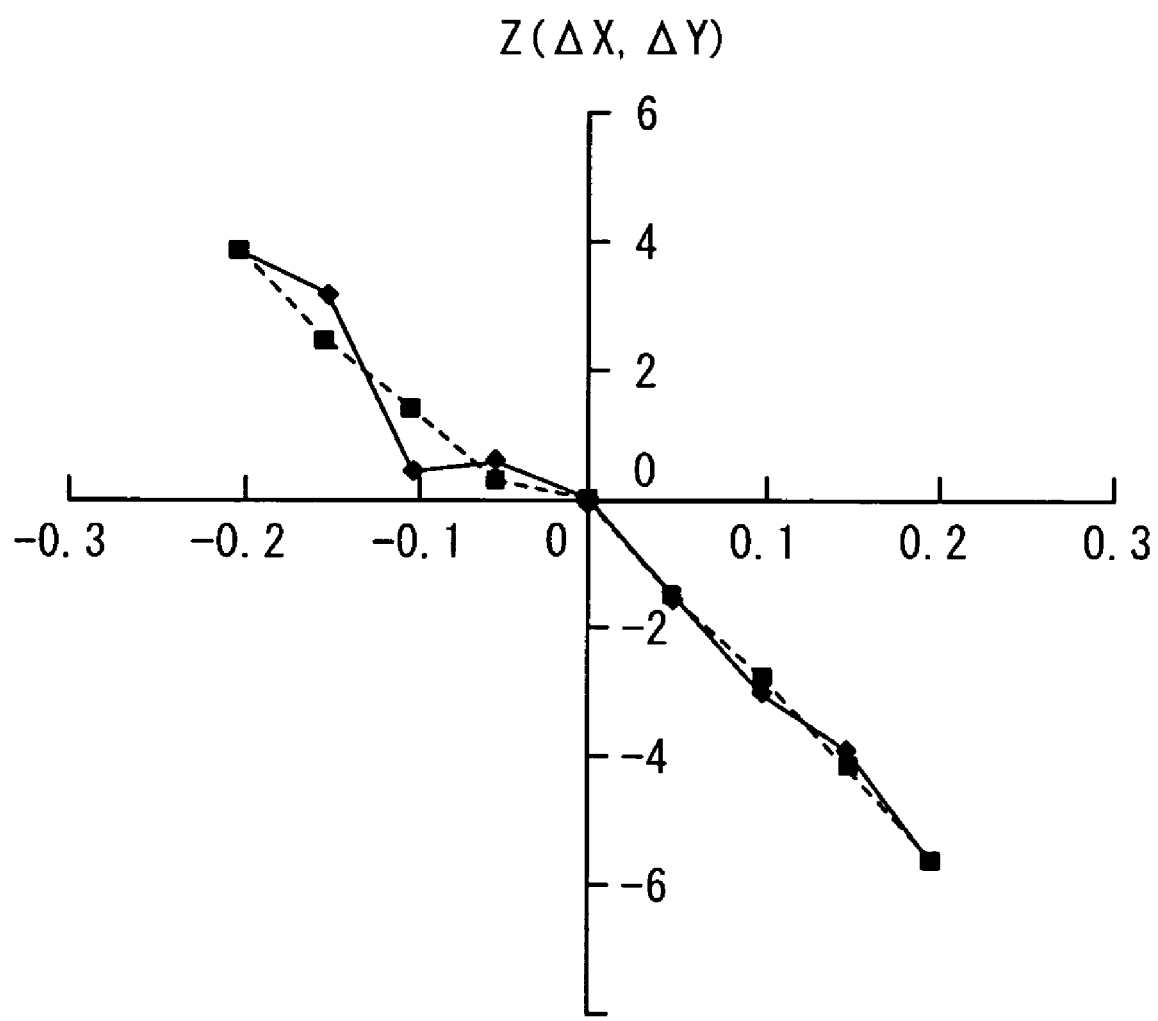
FIG. 15 is a diagram showing a relationship between density variations and colorimetric value differences.

Ideally, the calorimetric values of the color chart C1, which is calorimetrically measured by the calorimeter, should change monotonously depending on density variations. Actually, the calorimetric values of the color chart C1 may be measured as widely varied values, as indicated by the solid-line curve in FIG. 14, due to variations in the printed state of the color chart C1 as well as measurement errors. Similarly, the differences calculated by the colorimetric value difference calculator 82 may also be measured as widely varied values, as indicated by the solid-line curve in FIG. 15, although the differences therein should change monotonously depending on density variations.

Preferably, the calorimetric values or the differences should be smoothed and the measured values thereof stored in the standard colorimetric value storage unit 78 and the varied-density calorimetric value storage unit 80, or in the colorimetric value difference storage unit 84. The colorimetric values or the differences may be smoothed by averaging the colorimetric values or differences that are adjacent to each other in the density varying direction, or by interpolating adjacent colorimetric values or differences only within data that are widely different from the monotonously changing data.

The spectral reflectances or the spectral reflectance differences in the embodiment shown in FIG. 2, the spectral densities or the spectral density differences in the embodiment shown in FIG. 8, and the calorimetric densities or colorimetric density differences in the embodiment shown in FIG. 9, should also preferably be smoothed in the same manner. The spectral reflectances, spectral reflectance differences, spectral densities, and spectral density differences are smoothed per wavelength.

The present invention is not limited to the foregoing illustrated embodiments, but may freely be changed or modified, without deviating from the scope and essence of the present invention.

For example, the print color predicting system 10 employs the printer 18 to create the proof sheet P2. However, the print color predicting system 10 may employ a color monitor, for example, to generate and display the proof sheet P2. In this case, the profile generator 24 calorimetrically measures the color chart C2 displayed on the color monitor, and generates a monitor profile based on the obtained colorimetric values, whereupon the monitor profile is set in the color converter 16.

The print predicting profile 20 may be generated with respect to an arbitrary number of colors, e.g., two or more colors, rather than with respect to the four colors C, M, Y, K.

Although certain preferred embodiments of the present invention have been shown and described in detail, it should be understood that various changes and modifications may be made to the embodiments without departing from the scope of the invention as set forth in the appended claims.

What is claimed is:

1. A print color predicting method for predicting colors of a print produced by a printing press, comprising the steps of:
   generating a standard color chart comprising a plurality of color patches generated by the printing press, to which standard density conditions are set such that densities of color patches generated by two or more inks having a halftone dot percentage of a secured halftone dot percentage are the same as standard densities defined by a user, and to which respective halftone dot percentages of image data for the inks at predetermined intervals in the range from 0% to 100% halftone dot percentages are set;
   measuring said standard color chart to determine standard measured values;
   generating variation color charts, in which the density of each of the inks used to generate said print is independently varied by a given amount with respect to the standard density under the standard density conditions, and the densities of inks other than the varied ink are secured to said standard density conditions;
   measuring said variation color charts to determine varied measured values;
   when said inks are set to desired density variations for changing said standard densities for the inks to target densities desired by the user, adjusting said standard measured values using differences between said standard measured values and said varied measured values with respect to said inks set to said desired density variations; and
   predicting the colors of said print set to said density variations based on the relationship between the image data for generating said standard color chart and colorimetric values calculated based on the adjusted standard measured values.

2. A print color predicting method according to claim 1, wherein said standard measured values are adjusted by adding said differences with respect to said inks.

3. A print color predicting method according to claim 1, wherein said standard measured values are adjusted by interpolating said differences with respect to said inks according to said density variations to produce interpolated values, and adding said interpolated values.

4. A print color predicting method according to claim 1, wherein said standard measured values and said varied measured values represent spectral reflectances.

5. A print color predicting method according to claim 1, wherein said standard measured values and said varied measured values represent spectral densities.

6. A print color predicting method according to claim 1, wherein said standard measured values and said varied measured values represent colorimetric densities.

7. A print color predicting method according to claim 1, wherein said standard measured values and said varied measured values represent colorimetric values.

8. The method of claim 1, wherein the secured halftone percentage is one of: densities of patches of respective colors C, M, Y, K at 99% halftone dot percentages and solid densities of patches of respective colors C, M Y, K at 100% halftone dot percentages, and wherein in the variation color charts, an optical density is varied to at least one of −0.2, −0.1, +0.1 and +0.2 relative to the standard density, with C, M, Y, K set at 100% halftone dot percentages.

9. A print color predicting system for predicting colors of a print produced by a printing press, comprising:
   a measuring unit for measuring a standard color chart and variation color charts,
   a standard color chart comprising a plurality of color patches generated by the printing press, to which standard density conditions are set such that densities of color patches generated by two or more inks having a halftone dot percentage of a secured halftone dot percentage are the same as standard densities defined by a user, and to which respective halftone dot percentages of image data for the inks at predetermined intervals in the range from 0% to 100% halftone dot percentages are set,
   the variation color charts in which the density of each of the inks used to generate said print is independently varied by a given amount with respect to the standard density under the standard density conditions, and the densities of inks other than the varied ink are secured to said standard density conditions;

a measured value storage unit for storing standard measured values produced by measuring said standard color chart, and varied measured values produced by measuring said variation color charts, or differences between said standard measured values and said varied measured values with respect to the inks;

a density variation setting unit for setting desired density variations for changing said standard densities for the inks to target densities desired by the user; and a print predicting profile generator for adjusting said standard measured values using said differences with respect to said inks set to said desired density variations, and generating a print predicting profile based on the relationship between the image data for generating said standard color chart and colorimetric values calculated based on the adjusted standard measured values, wherein colors of said print, which are set to said density variations, are predicted using said print predicting profile.

10. A print color predicting system according to claim 9, wherein said print predicting profile generator includes a difference calculator for calculating differences between said standard measured values and said varied measured values with respect to the inks set to said density variations, and said standard measured values are adjusted by adding said differences with respect to said inks.

11. A print color predicting system according to claim 9, further comprising:

an output profile for converting predicted color values of said print, which are calculated using said print predicting profile, into output data of an output device, wherein said output device outputs a proof sheet of said print using said output profile.

12. A print color predicting system according to claim 9, wherein said standard measured values and said varied measured values represent spectral reflectances.

13. A print color predicting system according to claim 9, wherein said standard measured values and said varied measured values represent spectral densities.

14. A print color predicting system according to claim 9, wherein said standard measured values and said varied measured values represent colorimetric densities.

15. A print color predicting system according to claim 9, wherein said standard measured values and said varied measured values represent colorimetric values.

16. A print color predicting system according to claim 9, wherein said print predicting profile generator corrects said print predicting profile based on color information of a print sheet of said print.

17. A print color predicting system according to claim 9, wherein said print predicting profile generator corrects said print predicting profile based on a change in said standard measured values before and after a dot gain of said printing press has been varied.

18. A print color predicting system according to claim 9, wherein said print predicting profile generator corrects said print predicting profile based on a change in said standard measured values before and after inks for producing said print have been changed.

19. A print color predicting system according to claim 9, wherein said standard measured values are adjusted by interpolating said differences with respect to said inks according to said density variations to produce interpolated values, and adding said interpolated values.

20. The system of claim 9, wherein the secured halftone percentage is one of: densities of patches of respective colors C, M, Y, K at 99% halftone dot percentages and solid densities of patches of respective colors C, M Y, K at 100% halftone dot percentages, and wherein in the variation color charts, an optical density is varied to at least one of −0.2, −0.1, +0.1 and +0.2 relative to the standard density, with C, M, Y, K set at 100% halftone dot percentages.

* * * * *